(12) United States Patent
Uzkent et al.

(10) Patent No.: US 12,361,698 B2
(45) Date of Patent: Jul. 15, 2025

(54) SUPERVISED CONTRASTIVE LEARNING FOR VISUAL GROUNDING

(71) Applicant: SAMSUNG ELECTRONICS CO., LTD., Suwon-si (KR)

(72) Inventors: Burak Uzkent, Mountain View, CA (US); Vasili Ramanishka, Mountain View, CA (US); Yilin Shen, Santa Clara, CA (US); Hongxia Jin, San Jose, CA (US)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 423 days.

(21) Appl. No.: 17/899,118

(22) Filed: Aug. 30, 2022

(65) Prior Publication Data

US 2023/0075862 A1    Mar. 9, 2023

Related U.S. Application Data

(60) Provisional application No. 63/241,993, filed on Sep. 8, 2021.

(51) Int. Cl.
| | |
|---|---|
| *G06V 10/82* | (2022.01) |
| *G06F 16/53* | (2019.01) |
| *G06V 10/56* | (2022.01) |
| *G06V 10/75* | (2022.01) |
| *G06V 10/86* | (2022.01) |
| *G06V 10/94* | (2022.01) |

(52) U.S. Cl.
CPC .............. *G06V 10/82* (2022.01); *G06F 16/53* (2019.01); *G06V 10/56* (2022.01); *G06V 10/751* (2022.01); *G06V 10/86* (2022.01); *G06V 10/945* (2022.01)

(58) Field of Classification Search
None
See application file for complete search history.

(56) References Cited

U.S. PATENT DOCUMENTS

| 2017/0061250 A1 | 3/2017 | Gao et al. | |
| 2020/0380027 A1* | 12/2020 | Aggarwal | G06F 16/538 |
| 2021/0056355 A1* | 2/2021 | Luss | G06V 10/82 |
| 2021/0326660 A1 | 10/2021 | Krishnan et al. | |
| 2021/0327029 A1 | 10/2021 | Chen et al. | |
| 2021/0374553 A1 | 12/2021 | Li et al. | |

(Continued)

FOREIGN PATENT DOCUMENTS

| CN | 110222560 A | * | 9/2019 | ........... G06F 18/214 |

*Primary Examiner* — Bernard Krasnic
(74) *Attorney, Agent, or Firm* — Sughrue Mion, PLLC

(57) ABSTRACT

A method of training a neural network model includes generating a positive image based on an original image, generating a positive text corresponding to the positive image based on an original text corresponding to the original image, the positive text referring to an object in the positive image, constructing a positive image-text pair for the object based on the positive image and the positive text, constructing a negative image-text pair for the object based on the original image and a negative text, the negative text not referring to the object, training the neural network model based on the positive image-text pair and the negative image-text pair to output features representing an input image-text pair, and identifying the object in the original image based on the features representing the input image-text pair.

13 Claims, 5 Drawing Sheets

(56) References Cited

U.S. PATENT DOCUMENTS

| | | | |
|---|---|---|---|
| 2023/0237771 A1* | 7/2023 | Wen | G06V 20/698 382/128 |
| 2024/0289999 A1* | 8/2024 | Yi | G06T 11/00 |

* cited by examiner

SUPERVISED CONTRASTIVE LEARNING FOR VISUAL GROUNDING

CROSS-REFERENCE TO RELATED APPLICATION(S)

This application is based on and claims priority under 35 U.S.C. § 119 to U.S. Provisional Application No. 63/241,993, filed on Sep. 8, 2021 in the U.S. Patent and Trademark Office, the disclosure of which is incorporated herein by reference in its entirety.

BACKGROUND

1. Field

The disclosure relates generally to systems and methods for performing contrastive learning on multimodal tasks.

2. Description of Related Art

Referring expression comprehension models may localize an object in an image that is referred by a language query. To be successful, the model needs to comprehend what the language query is about and to identify the object requested in the query from the image. For example, with a query of "cat sitting next to the dog on the couch," the model needs to be able to understand the objects of dog, couch, and cat to predict the correct bounding box for the object of the cat in the image.

However, typical referring expression comprehension models lack a sufficient understanding of certain attributes, such as color and location attributes. Additionally, such models may suffer from overfitting to small scale datasets. Thus, there is a need to develop a learning objective that helps referring expression comprehension models to better learn key attributes and generalize better to unforeseen scenarios.

SUMMARY

According to an aspect of the disclosure, a method of training a neural network model may include generating a positive image based on an original image, generating a positive text corresponding to the positive image based on an original text corresponding to the original image, the positive text referring to an object in the positive image, constructing a positive image-text pair for the object based on the positive image and the positive text, constructing a negative image-text pair for the object based on the original image and a negative text, the negative text not referring to the object, training the neural network model based on the positive image-text pair and the negative image-text pair to output features representing an input image-text pair, and identifying the object in the original image based on the features representing the input image-text pair.

According to an aspect of the disclosure, a method of performing image recognition by a neural network model may include receiving a query based on an image displayed on a display device, converting the query into a text corresponding to the displayed image, inputting the displayed image and the text corresponding to the displayed image to the neural network model, and identifying at least one object in the displayed image corresponding to the query. The neural network model may be trained based on a positive image-text pair constructed by generating a positive image based on an original image, and generating a positive text corresponding to the positive image based on an original text corresponding to the original image, the positive text referring to an object in the positive image, and a negative image-text pair constructed based on the original image and negative text, the negative text not referring to the object.

According to an aspect of the disclosure, a system for training a neural network model may include a memory storing instructions, and a processor configured to execute the instructions to generate a positive image based on an original image, generate a positive text corresponding to the positive image based on an original text corresponding to the original image, the positive text referring to an object in the positive image, construct a positive image-text pair for the object based on the positive image and the positive text, construct a negative image-text pair for the object based on the original image and a negative text, the negative text not referring to the object, train the neural network model based on the positive image-text pair and the negative image-text pair to output features representing an input image-text pair, and identify the object in the original image based on the features representing the input image-text pair.

Additional aspects will be set forth in part in the description that follows and, in part, will be apparent from the description, or may be learned by practice of the presented embodiments of the disclosure.

BRIEF DESCRIPTION OF THE DRAWINGS

The above and other aspects, features, and aspects of embodiments of the disclosure will be more apparent from the following description taken in conjunction with the accompanying drawings, in which.

DETAILED DESCRIPTION

The following detailed description of example embodiments refers to the accompanying drawings. The same reference numbers in different drawings may identify the same or similar elements.

Figure 1:
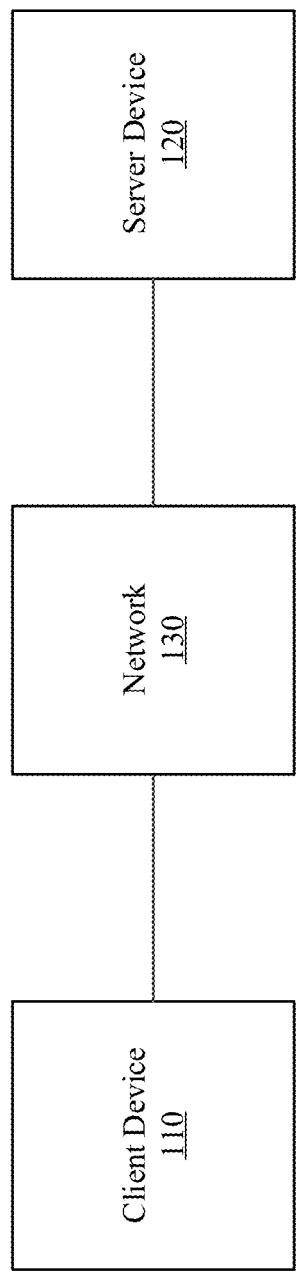
FIG. 1 is a diagram of devices of a system according to an embodiment.

FIG. 1 is a diagram of a system according to an embodiment. FIG. 1 includes a client device 110, a server device 120, and a network 130. The client device 110 and the server device 120 may interconnect via through the network 130 providing wired connections, wireless connections, or a combination of wired and wireless connections.

The client device 110 may include a computing device (e.g., a desktop computer, a laptop computer, a tablet computer, a handheld computer, a smart speaker, a server device, etc.), a mobile phone (e.g., a smart phone, a radiotelephone, etc.), a camera device, a wearable device (e.g., a pair of smart glasses or a smart watch), or a similar device, according to embodiments.

The server device 120 may include one or more devices. For example, the server device 120 may be a server device, a computing device, or the like which includes hardware such as processors and memories, software modules and a combination thereof to perform corresponding functions.

The network 130 may include one or more wired and/or wireless networks. For example, network 130 may include a cellular network (e.g., a fifth generation (5G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, or the like, and/or a combination of these or other types of networks.

The number and arrangement of devices and networks shown in FIG. 1 are provided as an example. In practice, there may be additional devices and/or networks, fewer devices and/or networks, different devices and/or networks, or differently arranged devices and/or networks than those shown in FIG. 1. Furthermore, two or more devices shown in FIG. 1 may be implemented within a single device, or a single device shown in FIG. 1 may be implemented as multiple, distributed devices. Additionally, or alternatively, a set of devices (e.g., one or more devices) may perform one or more functions described as being performed by another set of devices.

Figure 2:
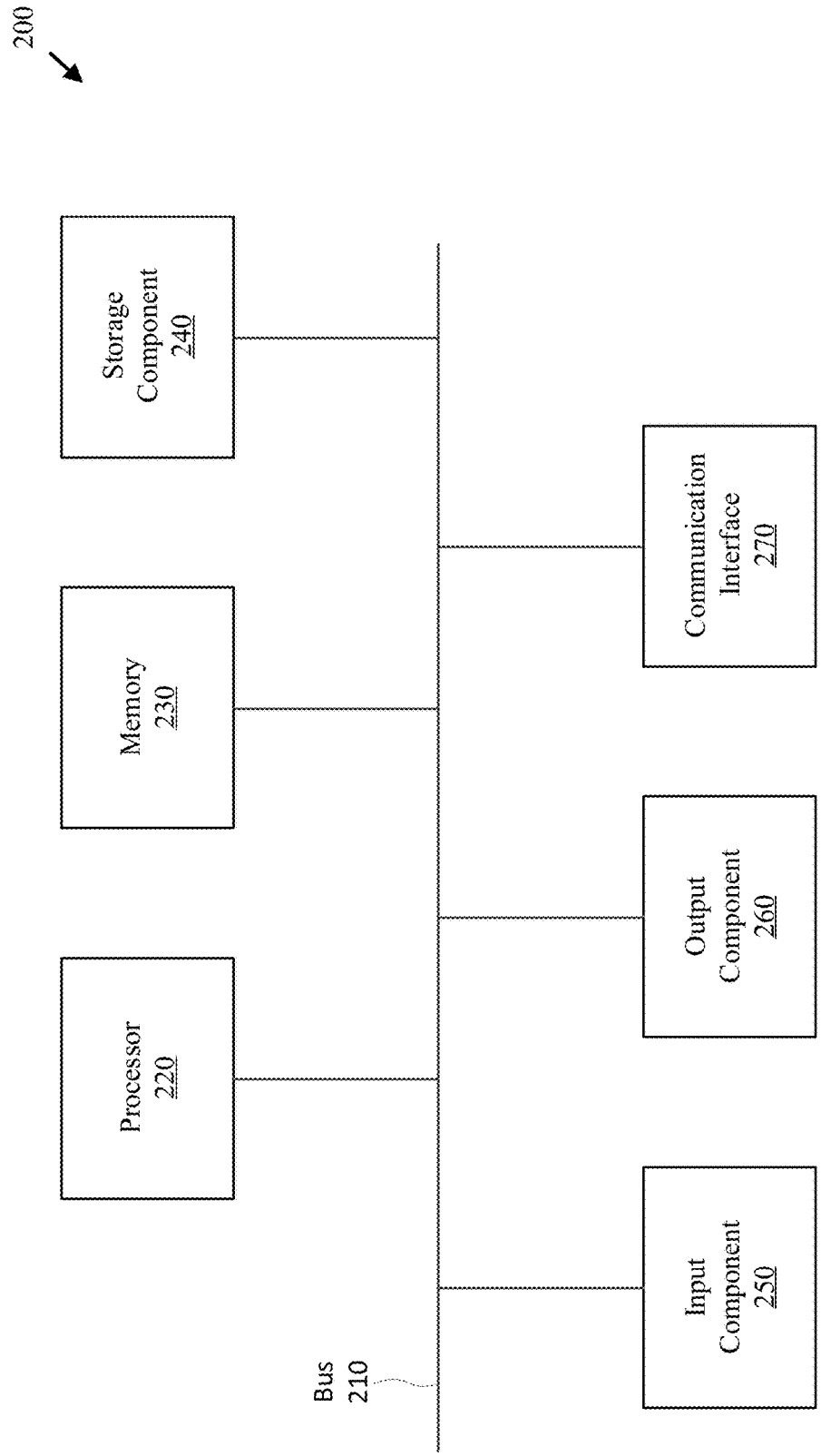
FIG. 2 is a diagram of components of the devices of FIG. 1 according to an embodiment.

FIG. 2 is a diagram of components of one or more devices of FIG. 1 according to an embodiment. Device 200 shown in FIG. 2 may correspond to the user device 110 and/or the server device 120.

As shown in FIG. 2, the device 200 may include a bus 210, a processor 220, a memory 230, a storage component 240, an input component 250, an output component 260, and a communication interface 270.

The bus 210 may include a component that permits communication among the components of the device 200. The processor 220 may be implemented in hardware, software, firmware, or a combination thereof. The processor 220 may be implemented by one or more of a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), and another type of processing component. The processor 220 may include one or more processors capable of being programmed to perform a corresponding function.

The memory 230 may include a random access memory (RAM), a read only memory (ROM), and/or another type of dynamic or static storage device (e.g., a flash memory, a magnetic memory, and/or an optical memory) that stores information and/or instructions for use by the processor 220.

The storage component 240 may store information and/or software related to the operation and use of the device 200. For example, the storage component 240 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

The input component 250 may include a component that permits the device 200 to receive information, such as via user input (e.g., a touch screen display, a keyboard, a keypad, a mouse, a button, a switch, and/or a microphone). The input component 250 may also include a sensor for sensing information (e.g., a global positioning system (GPS) component, an accelerometer, a gyroscope, and/or an actuator).

The output component 260 may include a component that provides output information from the device 200 (e.g., a display, a speaker, and/or one or more light-emitting diodes (LEDs)).

The communication interface 270 may include a transceiver-like component (e.g., a transceiver and/or a separate receiver and transmitter) that enables the device 200 to communicate with other devices, such as via a wired connection, a wireless connection, or a combination of wired and wireless connections. The communication interface 270 may permit device 200 to receive information from another device and/or provide information to another device. For example, the communication interface 270 may include an Ethernet interface, an optical interface, a coaxial interface, an infrared interface, a radio frequency (RF) interface, a universal serial bus (USB) interface, a Wi-Fi interface, a cellular network interface, or the like.

The device 200 may perform one or more processes described herein. The device 200 may perform operations based on the processor 220 executing software instructions stored in a non-transitory computer-readable medium, such as the memory 230 and/or the storage component 240. A computer-readable medium is defined herein as a non-transitory memory device. A memory device includes memory space within a single physical storage device or memory space spread across multiple physical storage devices.

Software instructions may be read into the memory 230 and/or the storage component 240 from another computer-readable medium or from another device via the communication interface 270. When executed, software instructions stored in the memory 230 and/or storage component 240 may cause the processor 220 to perform one or more processes described herein.

Additionally, or alternatively, hardwired circuitry may be used in place of or in combination with software instructions to perform one or more processes described herein. Thus, embodiments described herein are not limited to any specific combination of hardware circuitry and software.

Provided herein are a learning process that helps the referring expression comprehension models better understand key attributes, as well as a data augmentation method utilized in the learning process to help the referring expression comprehension models generalize better to unforeseen scenarios. Referring expression comprehension models may be trained to localize an object that is referred by a language query that includes attributes such as color and location. For example, for a language query of "white cat next to gray cat," the trained model may understand the difference between the white color and the gray color to detect the correct cat. In another example, in the case of a query of "person on the right next to the door," the trained model may understand the difference between being on the right and on the left, as well as the person being next to another object.

Provided are systems, methods and devices configured to perform supervised contrastive learning for visual grounding using referring expressions to improve bounding box detection accuracy. Some embodiments utilize the bounding box annotations to formulate a contrastive learning objective that relies on creating synthetic images for positive samples and manipulation of language queries for negative samples.

Provided are systems, methods and devices for training a neural network model. The system (as well as the methods and devices) may generate a positive image based on an original image. The positive image may be generated by identifying a visual property of the original image, and replacing the visual property with a predetermined visual effect corresponding to the visual property. The predetermined visual effect may include a preset color value that corresponds to a color of an object in the original image. The system may generate a positive text corresponding to the positive image based on an original text corresponding to the original image. The positive text may correspond to an object or the predetermined visual effect. For example, if the positive image shows a person with a red jacket, the generated positive text may be "person wearing a red jacket." The system may construct a positive image-text pair based on the positive image and the positive text. For example, the system may construct a positive image-text pair with the positive image including the person in the red jacket and the text of "person wearing a red jacket." That is, the positive image-text pair is a correct or accurate property of the image-text pair (i.e., the text paired with the positive image is true). The system may construct a negative image-text pair based on the positive image. For example, the system may replace the predetermined visual effect with another visual effect that is different from the predetermined visual effect. That is, in one example, the system may replace the red color in the positive image with a non-red color (e.g., generating a negative image based on the positive image). The system may construct a negative image-text pair by generating a negative text for the positive image. For example, for the image with the person wearing the red jacket, the system may generate a text of "person wearing a blue jacket," and then pair this text with the positive image of the person wearing the red jacket to generate the negative image-text pair. The system may also construct a negative image-text pair by generating a negative text for the original image. The system may train the neural network model based on the positive image-text pair and the negative image-text pair.

Provided are systems, methods and devices for performing image recognition by a neural network model. The system (as well as the methods and devices) may receive a query based on an image displayed on a display device. That is, the system may receive a voice query or a text query corresponding to an image displayed on the display device (e.g., a user may provide a voice input of "jacket" when an image of a person with a jacket is displayed on the display device). The system may convert the query into a text corresponding to the displayed image. The system may input the text corresponding to the displayed image to the neural network model. The system may identify at least one object in the displayed image corresponding to the query. The neural network model may be trained as described herein. The system may identify similar images to the displayed image that include similar objects to the at least one object, and provide the identified similar images to a user of the display device.

The systems disclosed herein may utilize a contrastive learning objective to help the referring expression comprehension models better learn key attributes as well as better generalizing for unforeseen scenarios. The system may utilize supervised contrastive learning for visual grounding using referring expressions. For visual grounding, the system is given the bounding box information of the referred objects and a corresponding language query. The system may utilize the super-vision to generate positive samples from two different images with the referred bounding having a similar category. Additionally, some embodiments may use data augmentation techniques to generate hard negatives.

Embodiments of the methods disclosed herein may be integrated into both single stage and two-stage visual grounding methods.

The system may pair original image and text pairs to their own positive images and text pairs. The contrastive objective is to reduce the distance between representations of positive pairs and increase the distance between the representations of negative pairs, and may be provided as in Equation (1).

$$-\log \frac{\exp(z_i \cdot z_i^+/\tau)}{\exp(z_i \cdot z_i^+/\tau) + \sum_{j=1}^{M} \exp(z_i \cdot z_j^-)/\tau)} \quad (1)$$

where $z_i \cdot z_i^+$ represents a positive pair (i.e., a correct pair), $z_i \cdot z_j^-$ represents a negative pair (i.e., an incorrect pair), and $\tau$ denotes a temperature hyper-parameter.

To construct negative pairs, the system may focus on key attributes such as color, location, etc., and manipulate these aspects in the original query to generate attribute-based negative texts. To do this, the system may use a color detector in a query and replace the detected color with a predetermined color sampled from a number of colors (e.g., red, orange, yellow, green, purple, blue, grey, pink, brown, black, white). For example, with the query "blue sofa on the right," the system may replace the color "blue" with the color "red," constructing the negative text sample of "red sofa on the right" for an image with a blue sofa on the right. Thus, the original image may be preserved and only the language query is changed.

A similar approach may be used for constructing location-based negatives. The system may divide the location keywords into two (i.e., (left, right) and (top, bottom). For example, the system may change an original query of "table on the right" to "table on the left" to generate a negative text for an image with a table on the right side. In another example, the system may change an original query of "cat on the top of a sofa" to "cat on the bottom of the sofa," thereby constructing another example of a location-based negative text.

Furthermore, the system may construct negative texts by completely swapping an original query with another query in a dataset, which may be referred to as a random negative text. The system may construct negatives using a language query for a different object in the same image.

The system may also construct positive image-text pairs. To construct positive pairs, the system may use a bounding box annotation of the object to replace the original bounding box with another bounding box with similar content. Given a bounding box from an image, the system may check for all the bounding boxes in the dataset and use the ones with high similarity to the original bounding box. After finding a bounding box with a high similarity, the content of the bounding box may be pasted into the original image, generating a positive image based on an original image.

To generate positive image-text pairs, the system may implement data augmentation. The system may generate flips of images to generate additional positive pairs. For example, when a flip or other operation (e.g., horizontal flip, vertical flip, rotation, translation, diagonal flip, etc.) is performed on the image and the bounding box annotation is still correct, then an additional positive image pair may be generated. The system may also crop an object in an image to a referred object in a query to generate positive pairs.

The system may generate positive pairs based on object swapping (i.e., synthetic image generation given the bounding box supervision from two different images in the same dataset). The system may search for a candidate image text pair to be a positive sample for the given source image text pair. In the first step, the system may filter out all the image text pairs that have a bounding box with different category label. This process leaves the image text pairs with a bounding box annotation having a similar category to the source image text pair. For example, if the bounding box class label of the source pair is dog, the system may only keep the other image text pairs with the bounding box label of dog. Given this set of candidates, the system may select one of them randomly and swap the bounding box of randomly chosen bounding box with the bounding box of the source image.

Performing object swap in this case may result in a synthetic image that violates the original referring expression. To avoid this problem, some embodiments use a neural network pre-trained on a dataset to search for a bounding box with more similar content to the original bounding box in the source image text pair. For example, the system may compute the features of all the bounding boxes with similar label to the original bounding box. Next, the system may compute the cosine similarity score between the source bounding box and candidate bounding boxes and choose the candidate bounding box with highest similarity. Finally, the system may replace the original bounding box with the candidate bounding box with highest similarity.

The system may construct negative image-text pairs. The system may generate location attribute negatives. The system may identify location keywords that are used to refer to objects in an image. While location keywords space may be very large, the system may observe that mainly four location keywords are used (e.g., (1) top, (2) bottom, (3) left and (4) right). Given this list of common location keywords, the system performs a location keyword swap process for designing negative pairs. That is, the system may swop the identified keyword with an incorrect keyword that does not corresponding to the original image. The system may split these keywords into two groups (e.g., (top, bottom) and (left, right)). Next, in a given referring expression, the system may search for keywords in the first group and replace that keyword with the other keyword in the same group. As an example, a referring expression of "bread on the top" is replaced with "bread on the bottom". This way, by preserving most of the query other than the location keyword, the system may generate a hard negative pair. For the second group (left, right), the system may follow the same procedure to replace one of the existing keyword with the other keyword in the same group. As an example, a referring expression of "bread on the left" is replaced with "bread on the right." By using such negative referring expressions, the system may learn representations that can better differentiate location keywords.

The system may construct negative image-text pairs based on color attribute. The system may follow a similar procedure to the location keyword swap to perform color keyword swap. More specifically, the system may keep the image similar and replace a color keyword in a referring expression with another color keyword. The system may detect a color keyword in a referring expression. Next, the system may use the list of main colors (e.g., preset color values) to find the color to replace the original color. In one embodiment, the list of the main colors may be listed as red, orange, yellow, chartreuse green, green, spring green, cyan, azure, blue, violet, magenta and rose, although other preset color values may be utilized. The system may replace the original color with one of the randomly sampled color from the main colors array. As an example, for a referring expression of "man with red shirt" may be replaced with "man with blue shirt." Similarly, an original referring expression of "man with blue shirt" may be replaced with "man with red shirt." This way, the system may generate a hard negative referring expression while keeping the input/original image similar.

The system may construct negative image-text pairs based on a referring expression swap. Given a set of image text pairs in a batch, the system may randomly sample a referring expression for an image to construct another negative image-text pair.

Figure 3:
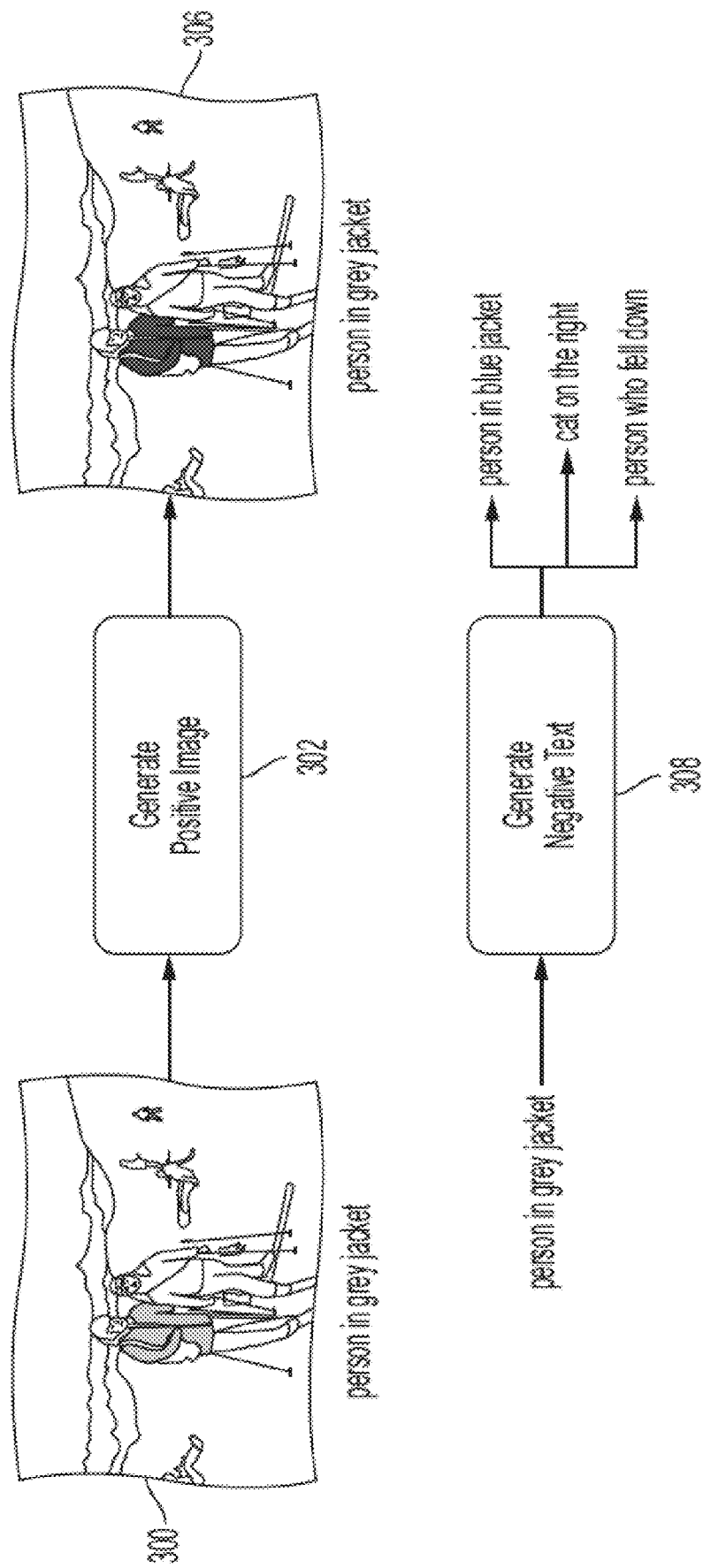
FIG. 3 is a diagram of operation flows for generating positive images and negative texts, according to an embodiment.

FIG. 3 is a diagram of operation flows for generating positive images and negative texts, according to an embodiment. As shown in FIG. 3, an original/source image 300 is provided. The original image 300 includes two persons, a bounding box annotation of the original image 300 may by "person in grey jacket," and the person located on the left may be wearing a jacket that is within a color range that, in this example, is indicated as grey.

In operation 302, the system may generate the positive image 306. The system may also use the "person in grey jacket" annotation to identify similar queries in the dataset for generating positive pairs. For example, the system may find a query of "person in grey coat" in the dataset, and then assign the "person in grey coat" annotation as a positive image-text pair. The system may also use paraphrasing to generate a positive text from an original text query. For example, a text query "banana at the top of the kitchen table" may be paraphrased as "banana on the table in the kitchen."

The system may apply a visual property (e.g., applying a predetermined visual effect) to the original image 300 to create additional positive training data and thereby to provide a robust multimodal model. For example, the system may replace the color of the jacket that is within the color range indicating the jacket is grey with a predetermined color value that the system associated with "grey" for normalization. To generate additional training data, the system may further replace the predetermined color value with another color value, thereby generating a negative text-image pair (i.e., the newly generated image would have a color of the jacket that is neither the shade of grey from the original image 300 or the applied predetermined color value from the positive image 306, and thus, the text annotation of "person in grey jacket" would be wrong). That is, the system may replace the grey color of the jacket in the original image 300 with a predetermined shade of a black color, such that the image with the text annotation of "person in grey jacket" would belong to an image with a person in a black jacket, thereby constructing a negative text-image pair.

Based on the text "person in gray jacket" annotation associated with the positive image 306, in operation 308, the system may generate a negative text by, for example, changing a color in an annotation to a random color, swapping the query with another query, using a query for another object in the image 306, etc. Examples of negative texts may "person in blue jacket," "cat on the right" and "person who fell down," as "person in blue jacket" does not match the bounding box annotation due to the color swap, there is no cat in the positive image 306 (i.e., a random sampled query), and the bounding box annotation does not match the person falling down in the positive image 306 (i.e., the query is for another object in the image 306).

Figure 4:
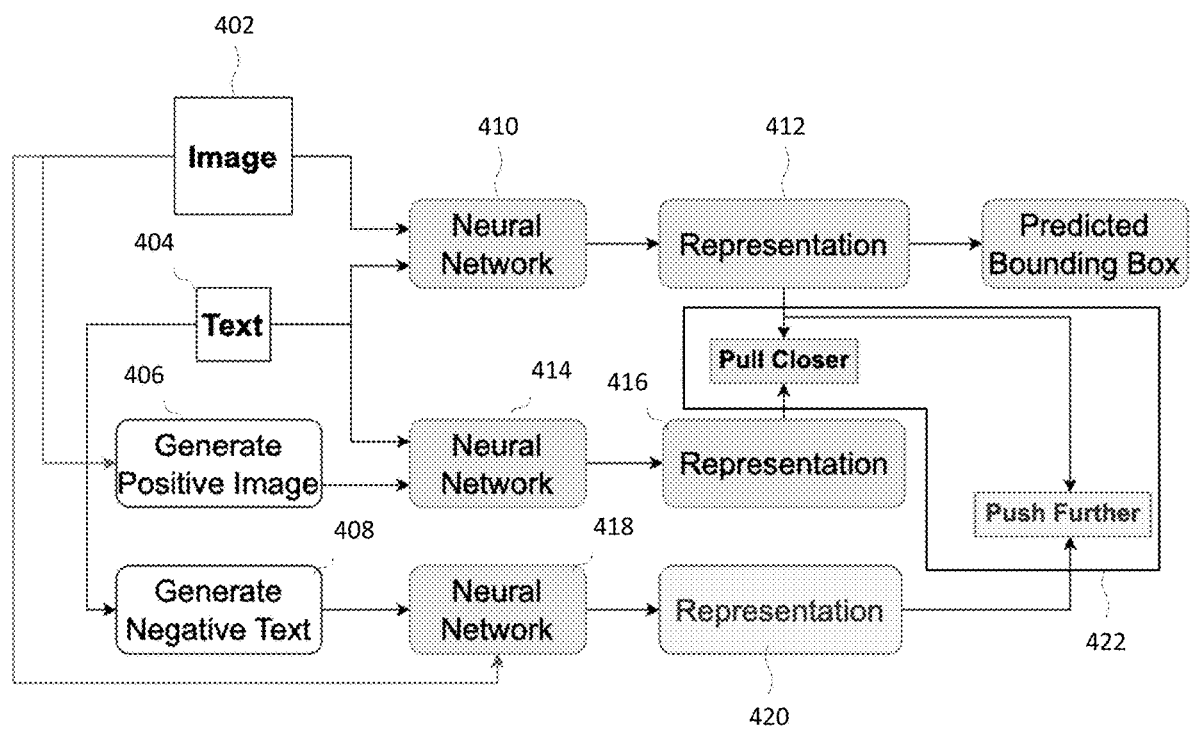
FIG. 4 is a diagram of an overall system operation, according to an embodiment.

FIG. 4 is a diagram of an overall system operation, according to an embodiment. An image 402 and a text 404 associated with the image 402 may be provided. In operation

406, the system may generate a positive image based on the image 402. In operation 408, the system may generate a negative text based on the text 404. The system may input the image 402 and the text 404 to a first neural network 410 to generate a base representation 412. The system may input the positive image and the text 404 to a second neural network 414 to generate a positive representation 416 of the positive pair. The system may input the negative text and the image 402 to a third neural network 418 to generate a negative representation 420 of the negative pair. The first neural network 410, the second neural network 414, and the third neural network 418 may share weights. In operation 422, the system calculates a contrastive learning loss, for example, using in Equation (1), and back-propagate the contrastive learning loss to the first neural network 410, the second neural network 414, and the third neural network 418. Through the training, the system may pull positive representations 416 closer to the base representation 412 and push negative representations 420 further away from each other and the base representation 412 to minimize the contrastive learning loss.

By generating positive image-text pairs and negative image-text pairs as disclosed herein, the need for collecting large scale labelled datasets may be reduced, as the system includes multiple processes for generating pairs (e.g., unique training data) from the same dataset. The system may be further utilized for product search and question answering. For example, a user may look for a piece of clothing, such as a hat, and the system may show similar items to the user for purchasing. Further, visual media may be playing on a display device, and a user may pause the media. Based on the pausing of the media, the user may provide a query (e.g., voice, text, etc.), such as "red hat on the man." Accordingly, the system may identify a red hat in the paused image based on the query, and may display results (e.g., products, websites, etc.) similar to the identified red hat in the image.

Figure 5:
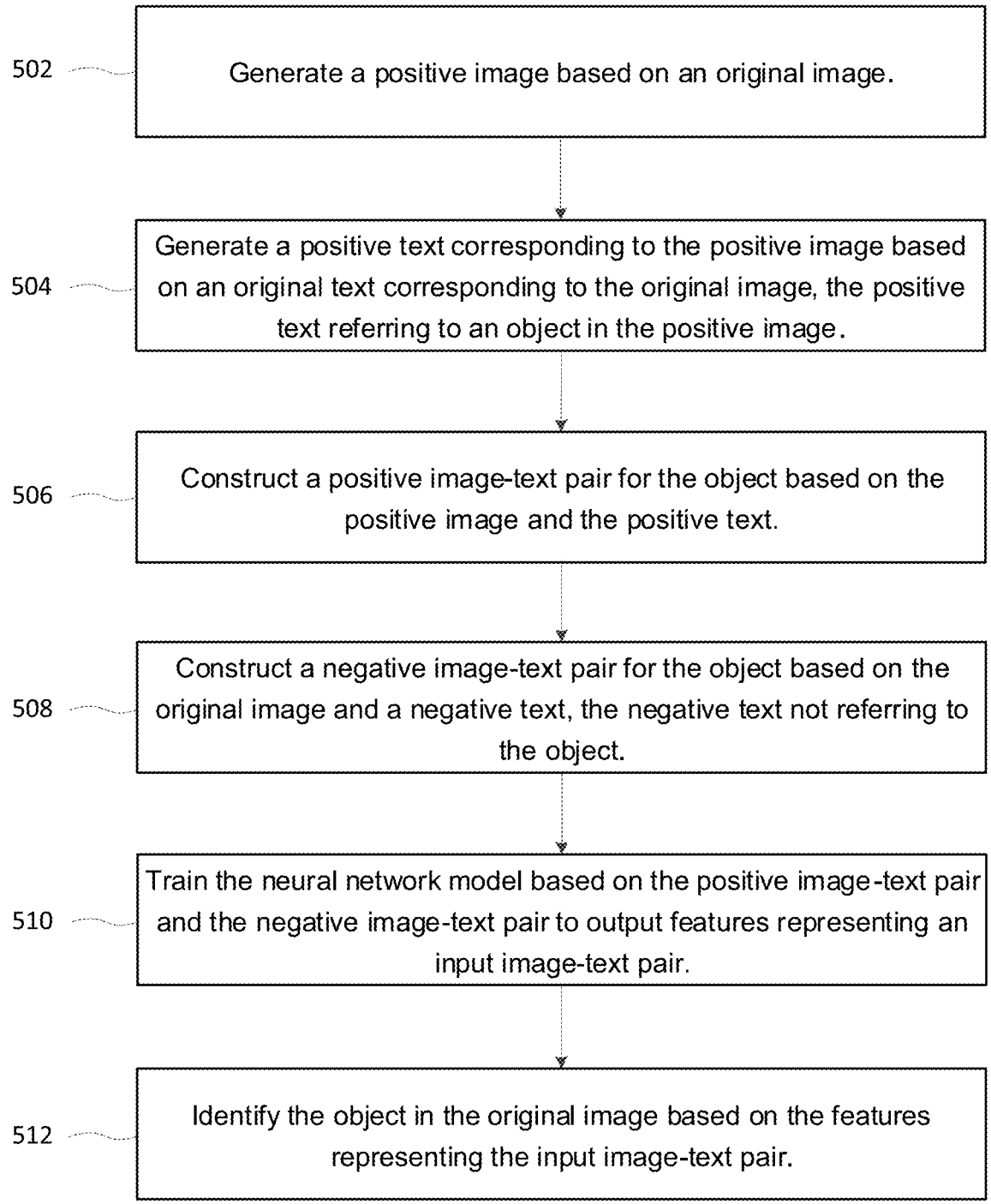
FIG. 5 is a flowchart of a method of training a neural network, according to an embodiment.

FIG. 5 is a flowchart of a method of training a neural network, according to an embodiment. In operation 502, the system may generate a positive image based on an original image. In operation 504, the system may generate a positive text corresponding to the positive image based on an original text corresponding to the original image, the positive text referring to an object in the positive image. In operation 506, the system may construct a positive image-text pair for the object based on the positive image and the positive text. In operation 508, the system may construct a negative image-text pair for the object based on the original image and a negative text, the negative text not referring to the object. In operation 510, the system may the neural network model based on the positive image-text pair and the negative image-text pair to output features representing an input image-text pair. In operation 512, the system may identify the object in the original image based on the features representing the input image text pair.

The foregoing disclosure provides illustration and description, but is not intended to be exhaustive or to limit the implementations to the precise form disclosed. Modifications and variations are possible in light of the above disclosure or may be acquired from practice of the implementations.

Some embodiments may relate to a system, a method, and/or a computer readable medium at any possible technical detail level of integration. The computer readable medium may include a computer-readable non-transitory storage medium (or media) having computer readable program instructions thereon for causing a processor to carry out operations.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program code/instructions for carrying out operations may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects or operations.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

At least one of the components, elements, modules or units (collectively "components" in this paragraph) represented by a block in the drawings including FIGS. 1-4 may be embodied as various numbers of hardware, software and/or firmware structures that execute respective functions described above, according to an example embodiment. According to example embodiments, at least one of these components may use a direct circuit structure, such as a memory, a processor, a logic circuit, a look-up table, etc. that may execute the respective functions through controls of one or more microprocessors or other control apparatuses. Also, at least one of these components may be specifically embodied by a module, a program, or a part of code, which contains one or more executable instructions for performing specified logic functions, and executed by one or more microprocessors or other control apparatuses. Further, at least one of these components may include or may be implemented by a processor such as a central processing unit (CPU) that performs the respective functions, a microprocessor, or the like. Two or more of these components may be combined into one single component which performs all operations or functions of the combined two or more components. Also, at least part of functions of at least one of these components may be performed by another of these components. Functional aspects of the above example embodiments may be implemented in algorithms that execute on one or more processors. Furthermore, the components represented by a block or processing steps may employ any number of related art techniques for electronics configuration, signal processing and/or control, data processing and the like The flowchart and block diagrams in the drawings illustrate the architecture, functionality, and operation of possible implementations of systems, methods, and computer readable media according to various embodiments. In this regard, each block in the flowchart or block diagrams may represent a module, segment, or portion of instructions, which comprises one or more executable instructions for implementing the specified logical function(s). The method, computer system, and computer readable medium may include additional blocks, fewer blocks, different blocks, or differently arranged blocks than those depicted in the Figures. In some alternative implementations, the functions noted in the blocks may occur out of the order noted in the Figures. For example, two blocks shown in succession may, in fact, be executed concurrently or substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

The descriptions of the various aspects and embodiments have been presented for purposes of illustration, but are not intended to be exhaustive or limited to the embodiments disclosed. Even though combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method of training a neural network model, comprising:

generating a positive image based on an original image by identifying a visual property of the original image, and replacing the visual property with a first predetermined visual effect corresponding to the visual property;

generating a positive text corresponding to the positive image based on an original text corresponding to the original image, the positive text referring to an object in the positive image;

constructing a positive image-text pair for the object based on the positive image and the positive text;

constructing a negative image-text pair for the object based on the original image and a negative text, the negative text not referring to the object, the constructing the negative image-text pair is further based on replacing the first predetermined visual effect with a second predetermined visual effect that is different from the first predetermined visual effect, the first predetermined visual effect comprising a first preset color value, and the second predetermined visual effect comprising a second preset color value different from the first preset color value;

training the neural network model based on the positive image-text pair and the negative image-text pair to output features representing an input image-text pair; and identifying the object in the original image based on the features representing the input image-text pair.

2. The method of claim 1, wherein the visual property comprises a color of an object in the original image, and
wherein the first predetermined visual effect comprises a preset color value corresponding to the color of the object in the original image.

3. The method of claim 1, wherein the identifying the object in the original image, comprises:
displaying a bounding box that surrounds the object in the original image to identify the object corresponding to the input image-text pair.

4. The method of claim 1, wherein training the neural network model comprises:
pushing a representation of an original image-text pair closer to a representation of the positive image-text pair; and
pulling the representation of the original image-text pair farther from a representation of the negative image-text pair.

5. The method of claim 1, wherein constructing the negative image-text pair further comprises:
identifying at least one keyword referring to the object in the original image; and
swapping the identified at least one keyword with an incorrect keyword that does not correspond to the original image.

6. A method of performing image recognition by a neural network model, the method comprising:
receiving a query based on an image displayed on a display device;
converting the query into a text corresponding to the displayed image;
inputting the displayed image and the text corresponding to the displayed image to the neural network model; and
identifying at least one object in the displayed image corresponding to the query,
wherein the neural network model is trained based on the method of training the neural network model according to claim 1.

7. The method of claim 6, wherein the query comprises a voice input from a user or a text input from the user.

8. The method of claim 6, further comprising:
identifying similar images to the displayed image that include similar objects to the at least one object; and
providing the identified similar images to a user of the display device.

9. A system for training a neural network model, comprising:
a memory storing instructions; and
a processor configured to execute the instructions to:
generate a positive image based on an original image by identifying a visual property of the original image, and replacing the visual property with a first predetermined visual effect corresponding to the visual property;
generate a positive text corresponding to the positive image based on an original text corresponding to the original image, the positive text referring to an object in the positive image;
construct a positive image-text pair for the object based on the positive image and the positive text;
construct a negative image-text pair for the object based on the original image and a negative text, the negative text not referring to the object, the construct the negative image-text pair is further based on replacing the first predetermined visual effect with a second predetermined visual effect that is different from the first predetermined visual effect, the first predetermined visual effect comprising a first preset color value, and the second predetermined visual effect comprising a second preset color value different from the first preset color value;
train the neural network model based on the positive image-text pair and the negative image-text pair to output features representing an input image-text pair; and
identify the object in the original image based on the features representing the input image-text pair.

10. The system of claim 9, wherein the visual property comprises a color of an object in the original image, and
wherein the first predetermined visual effect comprises a preset color value corresponding to the color of the object in the original image.

11. The system of claim 9, wherein the processor is configured to execute the instructions to identify the object in the original image by displaying a bounding box that surrounds the object in the original image to identify the object corresponding to the input image-text pair.

12. The system of claim 9, wherein the processor is configured to execute the instructions to train the neural network model by:
pushing a representation of an original image-text pair closer to a representation of the positive image-text pair; and
pulling the representation of the original image-text pair farther from a representation of the negative image-text pair.

13. The system of claim 12, wherein the processor is further configured to execute the instructions to generate the negative image by:
identifying at least one keyword referring to the object in the original image; and
swapping the identified at least one keyword with an incorrect keyword that does not correspond to the original image.

* * * * *